(12) United States Patent
Matouq et al.

(10) Patent No.: US 10,583,372 B2
(45) Date of Patent: Mar. 10, 2020

(54) QUALITY IMPROVEMENT OF OILY WASTEWATER

(71) Applicant: King Abdullah II Fund for Development, Amman (JO)

(72) Inventors: Mohammed Hamed Salem Matouq, Amman (JO); Rula Mohammad Hussein Aloqaili, Zarqa (JO); Alyaman Abdulsalam Mohammad Abu Rayyash, Amman (JO)

(73) Assignee: KING ABDULLAH II FUND FOR DEVELOPMENT, Amman (JO)

( * ) Notice: Subject to any disclaimer, the term of this patent is extended or adjusted under 35 U.S.C. 154(b) by 208 days.

(21) Appl. No.: 15/653,803

(22) Filed: Jul. 19, 2017

(65) Prior Publication Data

US 2019/0022554 A1  Jan. 24, 2019

(51) Int. Cl.
*C02F 1/28* (2006.01)
*B01D 17/02* (2006.01)
(Continued)

(52) U.S. Cl.
CPC .......... *B01D 17/0202* (2013.01); *B01J 20/02* (2013.01); *B01J 20/20* (2013.01); *B01J 20/2803* (2013.01);
(Continued)

(58) Field of Classification Search
CPC ...... B01D 17/00; B01D 17/0202; B01J 20/00; B01J 20/02; B01J 20/041; B01J 20/043; B01J 20/20; B01J 20/262; B01J 28/2803; B01J 20/3021; B01J 20/2803; B01J 20/3042; C02F 1/00; C02F 1/001; C02F 1/28; C02F 2/281; C02F 1/283; C02F 1/285; C02F 1/286; C02F 1/288; C02F 1/40; C02F 1/681; C02F 2101/32; C02F 2103/44; C09K 3/32
(Continued)

(56) References Cited

U.S. PATENT DOCUMENTS 3,851,026 A * 11/1974 Heskett et al. .... B01J 20/28026
264/54
3,865,758 A * 2/1975 Yoshida ................... B01J 20/22
210/496
(Continued)

FOREIGN PATENT DOCUMENTS

WO   WO-2011098091 A1 * 8/2011 ............. C08K 3/346

OTHER PUBLICATIONS

Abousnina, R., "Oily wastewater treatment: removal of dissolved organic components by forward osmosis," Master of Engineering Research—Research thesis, School of Civil, Mining and Environmental Engineering, University of Wollongong, Oct. 2012, 116 pages, http://rouow.edu.au/theses/3750.
(Continued)

*Primary Examiner* — Matthew O Savage
(74) *Attorney, Agent, or Firm* — Matheson Keys & Kordzik PLLC; Kelly Kordzik

(57) ABSTRACT

There is provided a novel composition for enhancing the quality of oily wastewater, the composition comprising oil shale ash particles physically bonded to a polymer matrix. There is also provided a method for preparing the composition, and a method for treating oily wastewater using the composition thereof.

11 Claims, 3 Drawing Sheets

(51) Int. Cl.
| | |
|---|---|
| *B01J 20/20* | (2006.01) |
| *B01J 20/28* | (2006.01) |
| *C09K 3/32* | (2006.01) |
| *B01J 20/02* | (2006.01) |
| *C02F 1/68* | (2006.01) |
| *C02F 1/00* | (2006.01) |
| *B01J 20/00* | (2006.01) |
| *B01D 17/00* | (2006.01) |
| *C02F 101/32* | (2006.01) |
| *C02F 103/44* | (2006.01) |

(52) U.S. Cl.
CPC ... *B01J 20/28004* (2013.01); *B01J 20/28026* (2013.01); *B01J 20/28042* (2013.01); *C02F 1/281* (2013.01); *C02F 1/288* (2013.01); *C09K 3/32* (2013.01); *B01D 17/00* (2013.01); *B01J 20/00* (2013.01); *B01J 2220/46* (2013.01); *C02F 1/00* (2013.01); *C02F 1/001* (2013.01); *C02F 1/681* (2013.01); *C02F 2101/32* (2013.01); *C02F 2103/44* (2013.01)

(58) Field of Classification Search
USPC .................................................. 210/690–694
See application file for complete search history.

(56) References Cited

U.S. PATENT DOCUMENTS

| | | | | |
|---|---|---|---|---|
| 4,279,757 | A | * | 7/1981 | DeBeuckelaer ... B01D 17/0202 210/671 |
| 2011/0177359 | A1 | * | 7/2011 | Gong ................... C23C 18/1639 428/675 |
| 2011/0247982 | A1 | * | 10/2011 | Alsewailem ............. B01J 20/12 210/679 |
| 2014/0034756 | A1 | * | 2/2014 | Gantenbein ........... B05B 7/0408 239/416.1 |

OTHER PUBLICATIONS

Al-Harahsheh, A. et al., "The Leachability Propensity of El-Lajjun Jordanian Oil Shale Ash," Jordan Journal of Earth and Environmental Sciences, vol. 4 (Special Publication, No. 2), Jan. 2012, pp. 29-34.

Aljaradin, M., "Comparison of Retort Water Treatment Methods—A Case Study in Jordan," VATTEN—Journal of Water Management and Research, vol. 68, Lund 2012, pp. 37-41.

Yu, L, et al., "A review of treating oily wastewater," Arabian Journal of Chemistry, King Saud University, Jun. 17, 2013, pp. 1-10, http://dx.doi.org/10.1016/j.arabjc.2013.07.020.

Zhong, J. et al., "Treatment of oily wastewater produced from refinery processes using flocculation and ceramic membrane filtration," Separation and Purification Technology, vol. 32, Jul. 2003, pp. 93-98.

* cited by examiner

QUALITY IMPROVEMENT OF OILY WASTEWATER

TECHNICAL FIELD

The present disclosure relates to compositions for treating wastewater, and more particularly to those compositions used for improving the quality of oily wastewater by reducing organic, hydrocarbon, and solid material content from such oily wastewater.

BACKGROUND INFORMATION

In general, oil content in wastewater has severe effects on the environment, and makes it much more difficult to reclaim such type of water.

Use of adsorbents is known in the art as a solution to remove oil content from wastewater, and among the commonly used adsorbents is activated carbon; however, it is quickly poisoned and is thus impractical in treating large volumes.

The use of oil shale ash is also reported as an effective means for adsorbing oil content in wastewater, as disclosed in the scientific article M. Aljaradin, "Comparison of Retort Water Treatment Methods—A Case Study in Jordan," Journal of Water Management and Research, 68: pp. 37-41, Lund 2012.

However, the use of oil shale ash renders the treated water turbid, and can introduce metal ions to the treated water, thus causing other problems that must then be resolved. Also, when oil shale ash is wetted, it forms a sludge that blocks the passage of water, which prevents it from being used in column filters.

SUMMARY

Aspects of the present disclosure provide a novel composition for improving the quality of oily wastewater, thus rendering the process of reclaiming such oily wastewater easier. In aspects of the present disclosure, the composition can be easily reclaimed compared to conventional solutions.

In aspects of the present disclosure, the composition includes oil shale ash particles physically bonded to a polymer matrix.

In aspects of the present disclosure, the composition improves the quality of the oily wastewater by reducing organic, hydrocarbon, and solid material content from such oily wastewater.

In aspects of the present disclosure, the composition includes about 30% by weight oil shale ash particles.

In aspects of the present disclosure, the oil shale ash particles have a mesh size in the range of 100 to 170 US (U.S. Sieve Size).

In aspects of the present disclosure, the oil shale ash particles have an average mesh size of about 120 US.

In aspects of the present disclosure, the polymer matrix includes polyurethane.

In aspects of the present disclosure, the composition has a particle mesh size in a range of 50 to 70 US.

In aspects of the present disclosure, the composition has an average particle size of about 60 US.

In aspects of the present disclosure, there is provided a process for preparing the aforementioned composition, the process including mixing an effective amount of polyol with the oil shale ash particles, and then adding an effective amount of isocyanate to the mixture. In aspects of the present disclosure, the process may further include optionally roasting the oil shale ash particles (e.g., at a temperature ranging between about 750° C. to about 950° C.), optionally crushing (e.g., by a jaw crusher) the roasted oil shale ash particles, optionally milling (e.g., by a ball mill) the crushed oil shale ash particles (e.g., for about one hour), and optionally sieving the milled oil shale ash particles. In aspects of the present disclosure, the process may further include optionally leaving the mixture to bind, dry, and settle (e.g., for about one to two hours)

In aspects of the present disclosure, the process further includes crushing (e.g., by using a jaw crusher) the mixture to obtain granulated particles of the composition having a mesh size in a range of 50 to 70 US.

In aspects of the present disclosure, the process further includes chopping (e.g., by using a knife) the mixture to obtain pieces of the composition, each having a volume of about 1 cm$^3$.

In aspects of the present disclosure, the oil shale ash particles form about 30% by weight of the composition.

In aspects of the present disclosure, within the resultant composition, the amount of isocyanate relates to the amount of polyol according to the ratio of about 1:1 by volume. In aspects of the present disclosure, the oil shale ash particles in the resultant composition have a mesh size in the range of 100 to 170 US.

In aspects of the present disclosure, the oil shale ash particles in the resultant composition have an average mesh size of about 120 US.

In aspects of the present disclosure, there is provided a process of separating oil content from oily wastewater including passing an amount of the oily wastewater through a filter that includes an effective amount of the aforementioned composition.

In aspects of the present disclosure, an effective amount of about 1 gram of oil shale ash in the aforementioned composition separates an amount of about 100 mg of oil in about 300 ml of oily wastewater.

In aspects of the present disclosure, an effective amount of the composition has a form of a monolith.

In aspects of the present disclosure, an effective amount of the composition has a form of granules with a mesh size ranging between 50 to 70 US.

BRIEF DESCRIPTION OF THE DRAWINGS

The disclosure will now be described with reference to the accompanying drawings, which illustrate embodiments of the present disclosure, without limiting the scope of the disclosure thereof, and in which.

DETAILED DESCRIPTION

Where a range of numerical values is recited herein, unless otherwise stated, the range is intended to include the endpoints thereof, and all integers and fractions within the range. It is not intended that the scope of the invention be limited to the specific values recited when defining a range.

Moreover, all ranges set forth herein are intended to include not only the particular ranges specifically described, but also any combination of values therein, including the minimum and maximum values recited.

Oily wastewater is an oily waste emulsion, in which oil is dispersed in the water phase, and may contain any one of several types of oil in a wide range of concentrations. In addition to oils, typical contaminants of these emulsions may include solids, silt, metal particles, emulsifiers, cleaners, soaps, solvents, and other residues. The type of oils found in these emulsions will depend on the industry. They may be fats, lubricants, cutting fluids, heavy hydrocarbons such as tars, grease, crude oils, and diesel oils, and also light hydrocarbons such as gasoline, kerosene, and jet fuel.

The term "effective amount" as used herein means an amount each of isocyanate and polyol that are capable of producing a polymer matrix to be mixed with a specified amount of oil shale ash particles to produce a composition configured in accordance with embodiments of the present disclosure that can effectively separate oil content from oily wastewater in accordance with embodiments of the present disclosure described herein.

Figure 1:
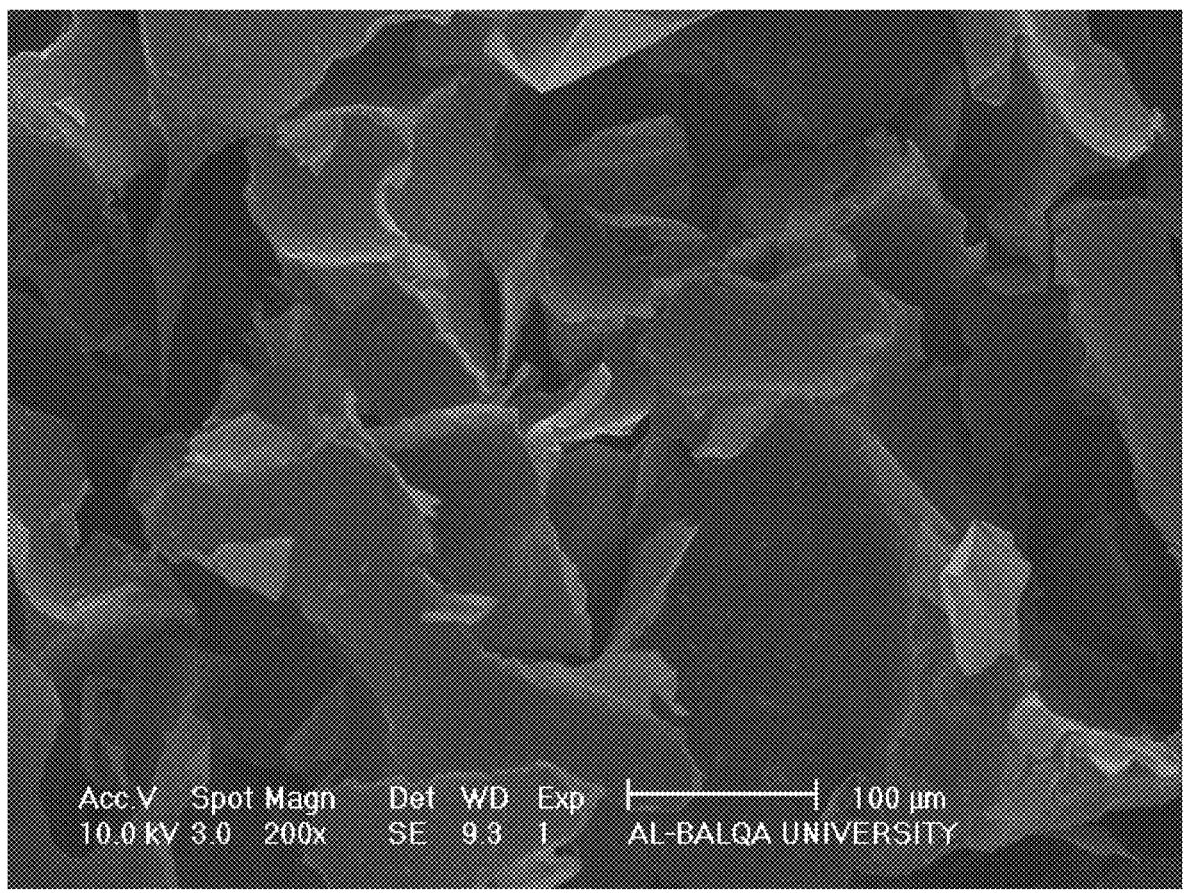
FIG. 1 shows an SEM image of a composition configured in accordance with embodiments of the present disclosure, wherein the image is taken at 100 µm scale.

FIG. 1 shows an SEM image of a composition configured in accordance with embodiments of the present disclosure for separating oil content from oily wastewater. In embodiments of the present disclosure, the composition includes oil shale ash particles physically bonded to a polymer matrix (e.g., polyurethane). The SEM image demonstrates that the oil shale ash particles are substantially uniformly physically bonded to the polymer matrix (polyurethane), and no aggregation of oil shale ash particles is obvious.

In embodiments of the present disclosure, the composition may include about 30% by weight oil shale ash particles and about 70% by weight polyurethane, wherein the polyurethane can be made up by mixing polyol with isocyanate in a ratio of about 1:1 by volume. In embodiments of the present disclosure, such oil shale ash particles may have a mesh size ranging between 100 and 170 US. In embodiments of the present disclosure, such oil shale ash particles may have an average mesh size of about 120 US.

In embodiments of the present disclosure, an amount of about 1 gram of oil shale ash particles contained within a composition configured in accordance with embodiments of the present disclosure is effective to adsorb an amount of about 100 mg of oil content contained in about 300 ml of oily wastewater.

The composition configured in accordance with embodiments of the present disclosure overcomes the problems of high levels of turbidity of treated water when using oil shale ash alone.

The composition configured in accordance with embodiments of the present disclosure does not form a sludge when wetted, and thus can be used in column filters.

The composition configured in accordance with embodiments of the present disclosure is easier to reclaim than conventional solutions.

Figure 2:
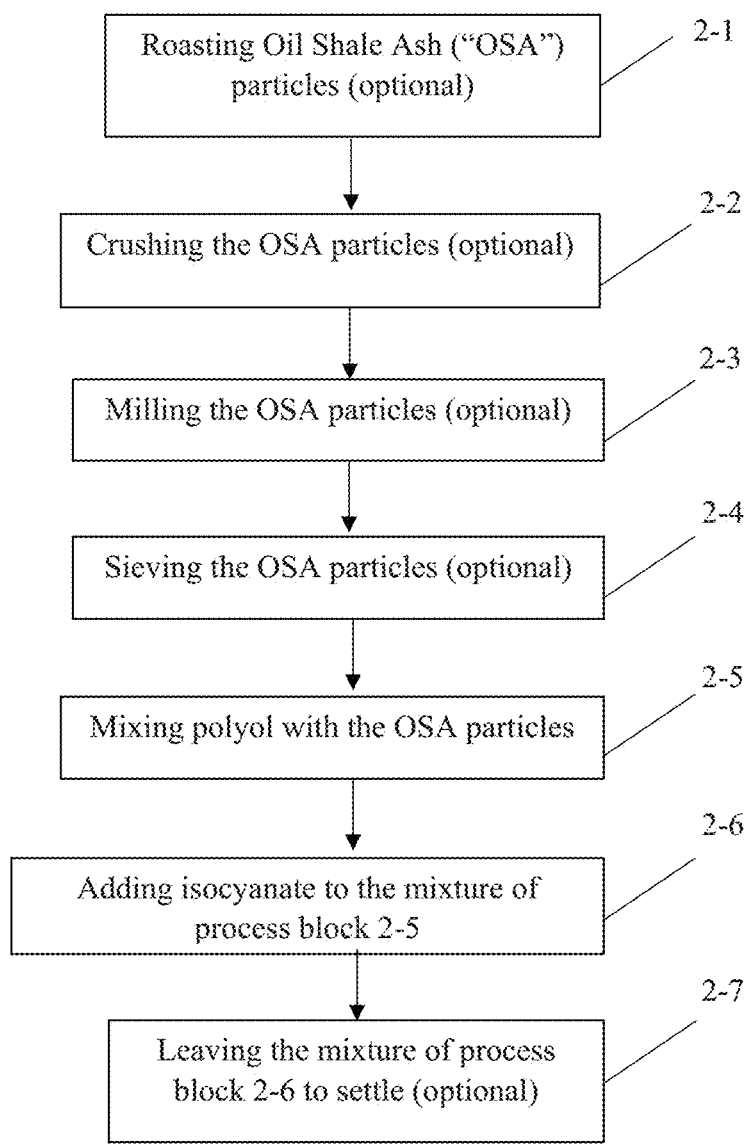
FIG. 2 illustrates a flowchart diagram of a process of preparing a composition configured in accordance with the embodiments of the present disclosure.

Reference is now being made to FIG. 2, which illustrates a process for producing a composition configured in accordance with embodiments of the present disclosure for improving the quality of oily wastewater. The process begins with a specified amount of oil shale ash particles.

In the process block 2-1, an optional process of roasting the oil shale ash particles (e.g., at a temperature ranging between about 750° C. to about 950° C.) (for about 4 hours) may be performed. In embodiments of the present disclosure, the oil shale ash particles may be roasted in order to improve the adsorptive capabilities of the oil shale ash particles within the composition.

In the process block 2-2, an optional process of crushing (e.g., by a jaw crusher) the roasted oil shale ash particles to obtain finer particles may be performed. In the process block 2-3, an optional process of milling (e.g., by a ball mill) the crushed oil shale ash particles (e.g., for about one hour) in order to obtain particles with a mesh size ranging from 100 to 170 US may be performed. In the process block 2-4, an optional process of sieving the milled oil shale ash particles to obtain only particles within the 100 to 170 US mesh size may be performed.

In the process blocks 2-5 and 2-6, the oil shale ash particles (whether they have been processed by any one or more of the process blocks 2-1 through 2-4, or not) are physically bonded to a polymer matrix to produce a composition configured in accordance with embodiments of the present disclosure. Within embodiments of the present disclosure, the polymer matrix may include polyurethane, which may be produced as a combination of polyol and isocyanate combined in a ratio of 1:1 by volume. Within embodiments of the present disclosure, the composition may be configured as a combination of 30% by weight of the oil shale ash particles physically bonded to 70% by weight of the polyurethane (produced as a combination of polyol and isocyanate combined in a ratio of 1:1 by volume).

In accordance with embodiments of the present disclosure, in the process block 2-5, an effective amount of polyol is mixed with the oil shale ash particles. In the process block 2-6, an effective amount of isocyanate is added to the mixture obtained in the process block 2-5 to obtain a composition of the oil shale ash particles bonded to a polymer matrix (e.g., polyurethane). Within embodiments of the present disclosure, the effective amount of isocyanate relates to the effective amount of polyol according to the ratio of about 1:1 by volume.

In the process block 2-7, an optional process of leaving the composition to bind, dry, and settle (e.g., for one to two hours) may be performed.

In embodiments of the present disclosure, the composition may be further chopped (e.g., using a knife) to obtain cube-shaped pieces of the composition each with approximately 1 $cm^3$ sizes. Such a size may improve handling and collection while providing a larger surface area that may increase the capacity of the composition to treat oily wastewater.

In embodiments of the present disclosure, the composition may be further crushed (e.g., by a jaw crusher) to obtain granulated particles of the composition of mesh sizes ranging from 50-70 US, wherein such sizes of the granulated particles of the composition may be suitable for using the composition as a filtering material in a filter cartridge, as such sizes enable a high capacity of treatment of oily wastewater while preventing the flow of the oily wastewater inside the cartridge from being blocked.

In embodiments of the present disclosure, the composition may be used for manufacturing a filtering material in a form of a monolith (i.e., a single piece having a shape of a cylinder, block, or sheet).

Figure 3:
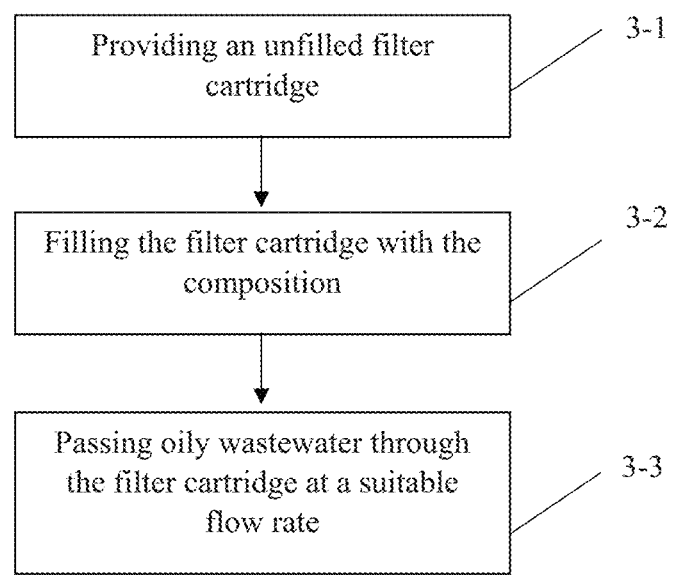
FIG. 3 illustrates a flowchart diagram of a process of treating oily wastewater using a composition configured in accordance with embodiments of the present disclosure.

Reference is now being made to FIG. 3, which illustrates a process for improving the quality of oily wastewater using a composition configured in accordance with embodiments of the present disclosure. In the process block 3-1, an unfilled conventional filter cartridge (e.g., such as those used in conventional water filtering systems, which may be configured to enclose a filtering material and to allow water to be filtered to pass through) is provided. In the process block 3-2, the cartridge is filled with the composition configured in accordance with embodiments of the present disclosure. In the process block 3-3, oily wastewater to be treated is passed through the filter cartridge (e.g., at a flow rate of about 2.4 liters/hour).

It should be appreciated that multiple such cartridges may be connected in series to each other.

Embodiments of the present disclosure will be further described in the following examples without, however, limiting the same thereto.

Example 1

In Example 1, three similar distilled water samples of 300 ml each were used. The first distilled water sample was used as a control. An amount of 5 grams of oil shale ash was added to the second distilled water sample. An amount of 16.7 grams of a composition configured in accordance with embodiments of the present disclosure (5 grams of oil shale ash particles physically bonded to a polymer matrix (5.85 grams of polyol mixed with 5.85 grams of isocyanate)) was added to the third distilled water sample. Each of the samples was agitated for about one hour at about 720 rpm at room temperature and pressure. Thereafter, the two mixtures within the second and third samples were decanted, and all three samples were subjected to an inductively coupled plasma mass spectrometry ("ICP-MS") analysis to determine their elemental content. The results are shown in Table 1.

TABLE 1

| | Samples | | |
|---|---|---|---|
| Element | Distilled water (ppm) | Oil Shale Ash and distilled water (ppm) | Composition configured in accordance with embodiments of the present disclosure and distilled water (ppm) |
| Calcium ("Ca") | <5.00 | 527.00 | 35.90 |
| Chromium ("Cr") | 0.00 | 1.35 | 0.22 |
| Strontium ("Sr") | 0.00 | 1.32 | 0.15 |
| Aluminum ("Al") | 0.00 | 0.83 | 0.26 |

As shown in Table 1, Example 1 clearly indicates that the use of a composition configured in accordance with embodiments of the present disclosure can achieve a surprisingly lower content of Ca, Cr, Sr, and Al in treated water in comparison with the use of oil shale ash alone in wastewater. It is evident that the bonding of the oil shale ash particles with an effective amount of the polymer matrix prevented metal ions from leaching into the water.

Example 2

In Example 2, three samples were prepared and contained in three similar transparent beakers in order to conduct a qualitative test on turbidity. The beakers were labelled A, B, and C. Each of the beakers included a sample of 300 ml of distilled water. The water in beaker A was left as a control. The water in beaker B was mixed with 5 grams of oil shale ash particles after being roasted, crushed, milled, and sieved as disclosed in the process blocks 2-1 through 2-4 in FIG. 2 to obtain an average particle size of the oil shale ash particles of about 125 µm (which corresponds to a 120 US mesh size). The water in beaker C was mixed with 16.7 grams of a composition configured in accordance with embodiments of the present disclosure (5 grams of oil shale ash particles bonded to a polymer matrix (e.g., an effective amount of polyol mixed in about a 1:1 ratio by volume with an effective amount of isocyanate; for example, 5.85 grams of polyol mixed with 5.85 grams of isocyanate)) (the composition was chopped into pieces, each having a volume of approximately 1 $cm^3$). The contents of the three beakers were agitated for about one hour at about 720 rpm at room temperature and pressure and left to settle for about 24 hours after agitation at room temperature and pressure as well. Then, the three beakers were observed in front of a white-colored background. It was clear that an observer could see through beakers A and C easier than beaker B. This indicates that the introduction of oil shale ash alone to distilled water rendered the water turbid, opposite to the introduction of the composition configured in accordance with embodiments of the present disclosure.

Example 3

In Example 3, four samples were prepared and contained in four similar transparent beakers in order to conduct a qualitative test on turbidity. The beakers were labelled A, B, C, and D. Each of the beakers included a sample of 300 ml of oily wastewater obtained from a commercial vehicle washing facility. The oily wastewater in beaker A was left as a control. The oily wastewater in beaker B was mixed with 5 grams of oil shale ash particles after being roasted, crushed, milled, and sieved as disclosed in the process blocks 2-1 through 2-4 in FIG. 2 to obtain an average particle size of about 125 µm. The oily wastewater in beaker C was mixed with 16.7 grams of a composition configured in accordance with embodiments of the present disclosure (5 grams of oil shale ash particles bonded to a polymer matrix (e.g., an effective amount of polyol mixed in about a 1:1 ratio by volume with an effective amount of isocyanate; for example, 5.85 grams of polyol mixed with 5.85 grams of isocyanate) (the composition was chopped into pieces, each having a volume of about 1 $cm^3$). The oily wastewater in beaker D was mixed with 11.7 grams of polyurethane (the amount of the polyurethane in beaker D was equivalent to the amount of the polyurethane present in beaker C, also chopped into pieces, each piece having a volume of about 1 $cm^3$). The contents of the four beakers were agitated for about one hour at about 720 rpm at room temperature and pressure and left to settle for about 24 hours after agitation at room temperature and pressure as well. Then, the four beakers were observed in front of a white-colored background. It was clear that an observer could not see through beakers A and D due to high turbidity, while the water content of beaker C was clearer than the water content in beaker B.

Example 4

After conducting the ICP-MS analysis on mixtures of distilled water samples with oil shale ash and the composition configured in accordance with embodiments of the present disclosure, each at a time, a test was conducted on samples of oily wastewater. In Example 4, a volume of about 1 $m^3$ of oily wastewater was obtained from a commercial vehicle washing facility and filled in a tank having an outlet connected to a water pump and a flow meter. The water pump was configured to pump water from the tank at a constant flow rate of about 2.4 liters/hour to a three-stage water filter filled with a composition configured in accordance with embodiments of the present disclosure, the composition having a form of granulated particles having an average mesh size of about 60 US. Each stage included a cylindrically-shaped container of 7 cm diameter and 22.7 cm length having an inlet and an outlet, wherein the containers of the three stages were connected in series. The outlet of the third stage of the filter was connected to a tap where a sample of 300 ml of the filtrated water was obtained. Simultaneously, a sample of 300 ml of oily wastewater was obtained from the tank to serve as a control sample. The water samples were subjected to testing, and the results are illustrated in Table 2, wherein "Pb" refers to lead; "COD" refers to chemical oxygen demand; "$BOD_5$" refers to biological oxygen demand after five days; "$NH_4^+$" refers to ammonium; "TSS" refers to total suspended solids; "FOG" refers to fat, oil, and grease; and "MBAS" refers to methylene blue active substances.

TABLE 2

| Parameter | Sample | |
| --- | --- | --- |
| | Oily Wastewater (ppm) | Oily Wastewater treated with composition configured in accordance with embodiments of the present disclosure (ppm) |
| Pb | <0.05 | <0.05 |
| COD | 6085 | Not detected |
| $BOD_5$ | 1042 | Not detected |
| Turbidity | 100 | 4.8 |
| $NH_4^+$ | 32.8 | 24.4 |
| TSS | 604 | Not detected |
| FOG | 255 | 11 |
| MBAS | 1.23 | Not detected |
| pH | 7.5 | 7.5-8.0 |

As indicated in Table 2, the use of a composition configured in accordance with embodiments of the present disclosure has significantly reduced the turbidity and the levels of COD, $BOD_5$, FOG, TSS, and TDS due to the high capacity of the binding power between the oil shale ash particles and the polymer matrix preventing it from being dissolved in water.

The above examples indicated that the composition configured in accordance with embodiments of the present disclosure enhanced the quality of oily wastewater by reducing the organic, hydrocarbon, oil, and solid material content.

While the present disclosure has been described in detail and with reference to specific embodiments thereof, it will be apparent to one skilled in the art that various additions, omissions, and modifications can be made without departing from the spirit and scope thereof.

Although the above description contains some specificity, these should not be construed as limitations on the scope of the invention, but is merely representative of the disclosed aspects of the present disclosure.

What is claimed is:

1. A method of separating oil content in wastewater comprising passing an amount of oily wastewater through a composition comprising oil shale ash particles physically bonded to a polymer matrix comprising polyurethane.

2. The method of claim 1, wherein the composition is configured to improve the quality of the oily wastewater by reducing turbidity of the oily wastewater through a reduction of organic, hydrocarbon, and solid material content within the oily wastewater.

3. The method of claim 1, wherein the composition comprises 30% by weight of the oil shale ash particles.

4. The method of claim 1, wherein the composition has a form of granulated particles with a mesh size ranging between 50-70 US.

5. The method of claim 1, wherein the composition has a form of granulated particles having an average mesh size of about 60 US.

6. The method of claim 1, wherein the composition has a form of small pieces, wherein each of the small pieces has a volume of about 1 $cm^3$.

7. The method of claim 1, wherein the composition comprises about 30% by weight of the oil shale ash particles and about 70% by weight of the polyurethane, wherein the polyurethane comprises a combination of polyol with isocyanate in a ratio of about 1:1 by volume.

8. The method of claim 1, wherein the oil shale ash particles have a mesh size in a range of 100 to 170 US.

9. The method of claim 1, wherein the oil shale ash particles have an average mesh size of about 120 US.

10. The method of claim 1, wherein the oil shale ash particles have been roasted previous to bonding with the polymer matrix.

11. The method of claim 1, wherein an amount of 1 gram of the composition separates an amount of 100 mg of oil in 300 ml of the oily wastewater.

* * * * *